United States Patent [19]

Eagan

[11] Patent Number: 5,254,007
[45] Date of Patent: Oct. 19, 1993

[54] BABY ENTERTAINMENT AND LEARNING APPARATUS FOR HIGHCHAIRS

[76] Inventor: Chris S. Eagan, 670 Eldorado La., Las Vegas, Nev. 89123

[21] Appl. No.: 10,878

[22] Filed: Jan. 29, 1993

[51] Int. Cl.$^5$ ............................................. G09B 5/04
[52] U.S. Cl. ..................................... 434/319; 108/43; 446/227; 446/397; 297/135
[58] Field of Search ............... 434/319, 321, 308, 309, 434/311; 446/397, 227; 297/135, 145; 108/43, 59; 312/235.8, 235.9

[56] References Cited

U.S. PATENT DOCUMENTS

| | | | |
|---|---|---|---|
| 4,288,537 | 9/1981 | Knetzger | 446/397 X |
| 4,791,741 | 12/1988 | Kondo | 446/397 X |
| 4,804,328 | 2/1989 | Barrabee | 434/319 X |
| 5,016,147 | 5/1991 | Voorhees | 108/43 X |
| 5,182,872 | 2/1993 | Lee et al. | 446/397 X |

Primary Examiner—John G. Weiss
Assistant Examiner—Jeffrey A. Smith
Attorney, Agent, or Firm—Philip D. Junkins

[57] ABSTRACT

A baby entertainment and learning apparatus for highchairs including a removable tray having in its top surface a series of pressure sensitive microswitches. A series of interchangeable tray top panels, each presenting a series of depressible picture blocks, may be selectively placed on the highchair tray for overlaying and activating the microswitches of the tray. Each tray top panel has a panel identity device. Circuitry components are mounted to the underside of the tray and include: an integrated circuit microchip within which is stored voice, sound and musical information; a low voltage battery power source; an audio speaker; and panel switches corresponding in number to the series of tray top panels and each positioned to interact with a single panel identity device. When a tray top panel is placed on the tray the circuitry components are electrically interconnected via a specific panel switch, as determined by the panel identity device of such panel, with the appropriate information storage section of integrated circuit microchip. The circuit components are activated by finger touch pressure of a baby applied to a picture block of the tray top panel and therethrough to the pressure sensitive microswitch of the tray underlying the touched block thereby selectively releasing the stored information of the microchip corresponding to the subject matter of such picture block as audible voice, sound or musical information through the speaker.

14 Claims, 2 Drawing Sheets

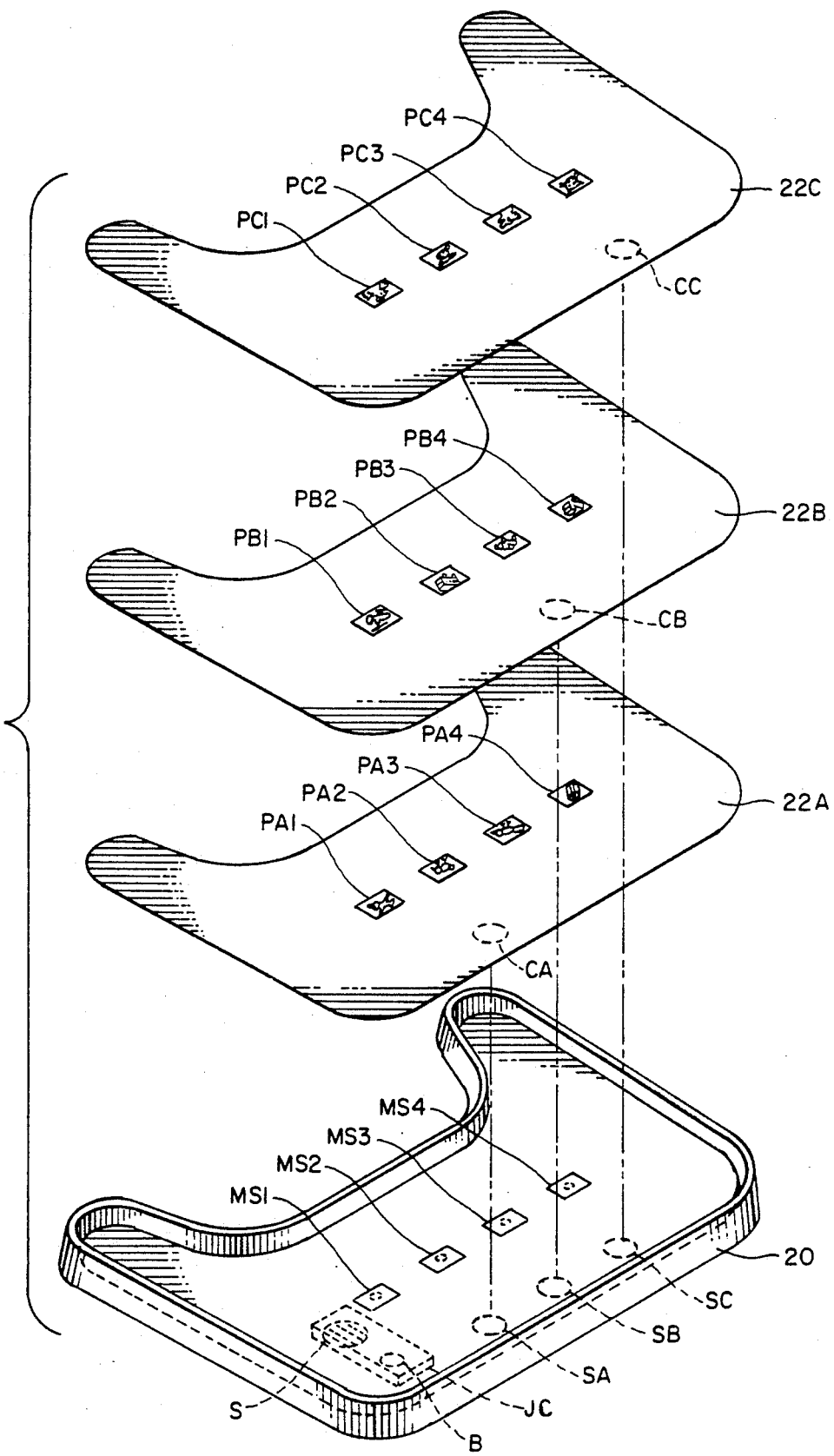

5,254,007

BABY ENTERTAINMENT AND LEARNING APPARATUS FOR HIGHCHAIRS

FIELD AND BACKGROUND OF THE INVENTION

The present invention relates to the food supporting trays that are associated with baby highchairs. More particularly, the invention relates to baby highchairs which have trays that are removable and provide a surface area for holding feeding bottles, cups, dishes and utensils for use by a baby seated in such chairs. Such highchair trays usually include a peripheral rim so that objects placed on the tray are not easily pushed off by the baby. Frequently, the trays for baby highchairs serve as holding surfaces for play toys for babies before and after their feedings.

It is a general object of the present invention to provide removable trays for baby highchairs which provide the baby seated in such chairs with means of amusement and learning before, during and after their feedings.

It is a further object of this invention to provide trays for baby highchairs which include one or more picture blocks associated with finger pressure spots capable of actuation by a baby and which, upon finger touch by the baby, result in voice, sound or musical responses corresponding to the subject matter of the picture blocks.

It is another object of the invention to provide trays for baby highchairs which include interchangeable insert panels each including a series of related picture blocks associated with finger pressure spots on the tray capable of actuation by a baby and which, upon finger touch by the baby, result in voice, sound or musical responses corresponding to the subject matter of the picture blocks of each panel.

Other objects and advantages of the invention will be apparent from the following summary and description of the invention, taken together with the accompanying drawing figures.

SUMMARY OF THE INVENTION

The present invention relates to novel trays for baby highchairs which include one or more picture blocks associated with finger pressure spots (usually located below the picture blocks) capable of actuation by a baby seated in the highchair. Actuation of the finger pressure spots upon touch by the baby results in voice, sound or musical responses corresponding to the subject matter of the picture blocks. For example, if a picture block includes an illustration of a cow and actuation of the pressure spot occurs by baby touch of the cow illustration, a "moo" sound is generated.

In a preferred form of the invention, related groups of picture blocks (for example a transportation picture sequence of auto, train, bus and fire engine) are presented on removable, interchangeable insert panels which fit onto the highchair tray top. The insert panels may be of relatively thin sheet plastic structure so that picture blocks on each panel are depressible. The picture blocks of the insert panels are oriented so that, with a panel in place on the tray, they rest over finger pressure spots on the tray top surface, the pressure spots comprising a series of touch sensors or pressure sensitive microswitches. The touch sensors or microswitches are electrically interconnected to tray circuitry (mounted on the underside of the tray) which includes as circuitry components: an integrated circuit (IC) microchip with a plurality of ports or terminals (for storing voice, sound and/or musical information); a battery power source; a speaker; one or more panel identity switches; and a circuit "on-off" master switch.

Each of the several interchangeable tray top panels, which each bear a different picture block sequence, include means interactive with the tray to activate one of the panel identity switches. Thus, the panel identity switch which is activated by a specific tray top panel in turn identifies that portion of the IC microchip circuitry which contains the stored voice, sound or musical information related to the picture block sequence of such panel. Upon finger pressure actuation of a specific picture block (and the underlying touch sensor or pressure actuated microswitch located at the tray top surface) in the block sequence of the panel, the voice, sound or musical information of the microchip related to such picture block is released and played through the speaker. Although a number of types of panel identity switches may be employed in the tray circuitry of the invention, preferred forms of such a switch include microswitches and magnetic switches including a magnetic switch arm which is attracted to a metallic plate or foil disc on the underside of each interchangeable tray top panel. Alternatively, the underside of each panel may carry a circuit contact plate or disc which closes a metal contact type panel identity switch.

A vast assortment of groups of picture blocks may be provided on the removable, interchangeable insert panels which fit onto the highchair tray of the present invention. When in place on the highchair tray top, each of such panels (via its panel identity switch means) alters the tray circuitry whereby the circuitry portion of the IC microchip including the appropriate voice, sound or musical information is selectively activated when a picture block (and associated touch sensor) is depressed by finger touch pressure. Thus, where the tray is provided with four touch sensor or pressure sensitive microswitch positions, top insert panels may display, for example, picture block series including: an auto, train, bus and fire engine picture series with appropriate vehicle sounds generated; a cow, chicken, cat and dog picture series with appropriate animal sounds generated; and a mother, father, brother and sister picture series with appropriate voice statements generated.

BRIEF DESCRIPTION OF THE DRAWING FIGURES

FIG. 1 is a perspective view of a baby's highchair including a removable tray which presents a series of picture blocks in accordance with the invention which may be touched by a baby seated in the chair thereby generating a voice, sound or musical response corresponding to the subject matter of the picture block that has been touched;

FIG. 2 is an exploded perspective view of the tray for the highchair of FIG. 1 showing a collection of removable, interchangeable insert panels each including a series of picture blocks; and FIG. 3 is a schematic diagram of the electronic circuit associated with the highchair tray of FIG. 2 for producing an appropriate voice, sound or musical response corresponding to the subject matter of the picture blocks of a collection of removable, interchangeable insert panels for such tray.

DETAILED DESCRIPTION OF PREFERRED EMBODIMENTS OF THE INVENTION

Figure 1:
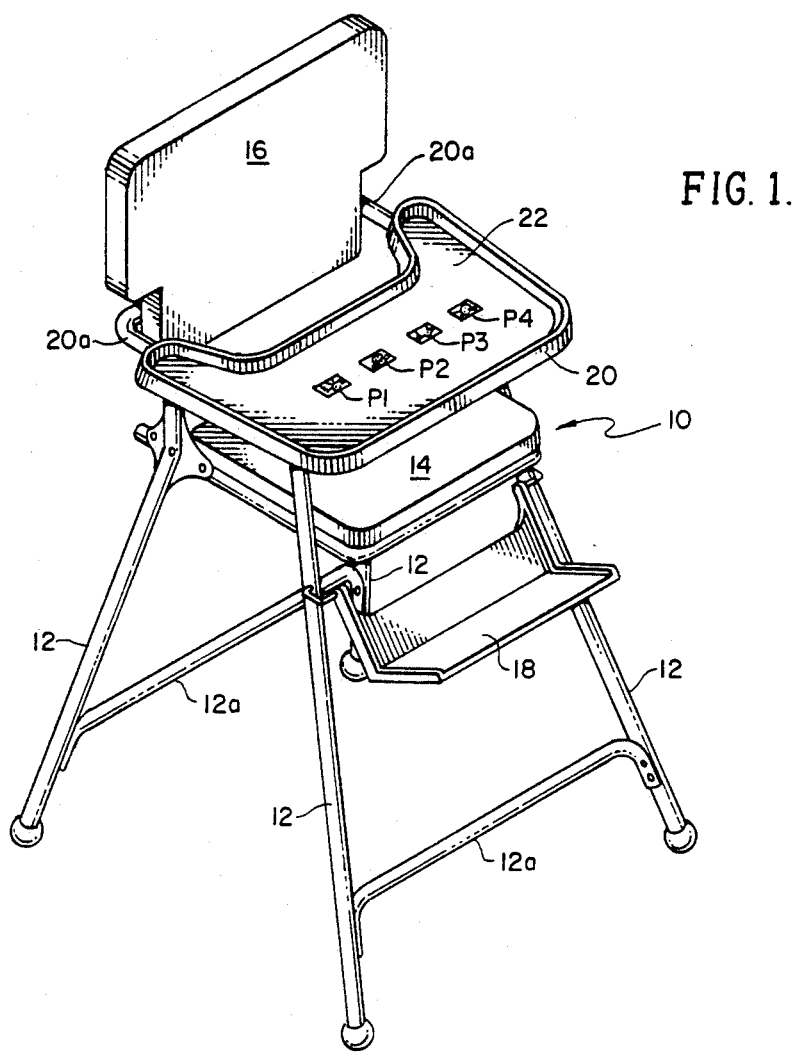

The present invention relates to novel tray for baby highchairs which include one or more removable, interchangeable insert panels each presenting a series of picture blocks which when touched by a baby's finger cause a voice, sound or musical response corresponding to the subject matter of the picture block touched. Illustrated generally in FIG. 1 is a baby's highchair 10 including support legs 12, a seat 14, a back support 16 and a foot support unit 18. The front and rear pairs of legs 12 are interconnected for chair stability purposes by leg struts 12a.

A removable food tray 20 of well known design, with a raised peripheral rim, is supported above the chair seat 14 by tray support arms 20a. Located on the tray 20 is a tray top insert panel 22 which takes the shape of the tray within its rimmed area and which is preferably formed of washable sheet plastic material. There is printed on the insert panel 22 a series of picture blocks P1, P2, P3 and P4 of related subject matter such as animals including a cow, a chicken, a cat and a dog or such as vehicles including an auto, a train, a bus and a fire engine. The picture blocks P1-P4 are located on the panel 22 within reach of a baby seated within the highchair and such blocks are oriented so as to be positioned directly over finger pressure spots of the tray top (not shown in FIG. 1). The finger pressure spots comprise a series of touch sensors or pressure sensitive microswitches which may be actuated by finger touch through the thin sheet material of the panel 22.

Referring now to FIG. 2 there is shown in an exploded perspective view the tray 20 for the highchair of FIG. 1 showing a collection of removable, interchangeable insert panels 22A, 22B and 22C. The shape of each insert panel corresponds to the area shape of tray 20 within the rim of the tray. The tray 20, in accordance with the present invention, includes touch sensors or microswitches MS1, MS2, MS3 and MS4 which present sensor or switch activation spots or surfaces contiguous with the upper surface of the tray. These sensors or microswitches are electrically interconnected with the tray circuitry located on the underside of the tray, such circuitry being shown in FIG. 3 and described hereinafter.

Mounted to the underside of the highchair tray 20 are the other components of the tray circuitry (shown in dashed outline) including: an integrated circuit microchip IC, a battery power source B, a buzzer-type speaker S and series of panel identity switches SA, SB and SC. Included in the tray circuitry, but not shown in dashed outline in FIG. 2, is a circuit "on-off" master switch (switch CS of FIG. 3) which is used to activate or deactivate the tray circuitry, i.e., turn on the circuitry when it is desired to have audible sound responses to finger touch of the picture blocks on an insert panel in place on the tray and turn off the circuitry when no audible sound response is desired.

The collection of removable, interchangeable tray insert panels 22A, 22B and 22C include, respectively, picture block series PA1, PA2, PA3 and PA4, picture block series PB1, PB2, PB3 and PB4, and picture block series PC1, PC2, PC3 and PC4. Each of these picture block series is positioned to cover and to interact with the touch sensors or microswitches MS1, MS2, MS3 and MS4 of the tray 20 when the respective insert panel is seated in place on the tray. The tray insert panels 22A, 22B and 22C also include insert switch contacts CA, CB and CC, respectively, which serve to interact, respectively, with the panel identity switches SA, SB and SC of the tray 20 to appropriately interconnect that portion of the IC microchip circuitry which contains the stored voice, sound or musical information related to the picture block sequence of each panel. The switch contacts CA, CB and CC on panels 22A, 22B and 22C, respectively, may comprise of contact plates which merely close leads of the respective switches SA, SB and SC or the contacts CA, CB and CC may comprise metallic plate or foil discs which attract a magnetic switch arm of switches SA, SB and SC that closes, respectively, the appropriate circuitry with respect to panels 22A, 22B or 22C.

Figure 3:
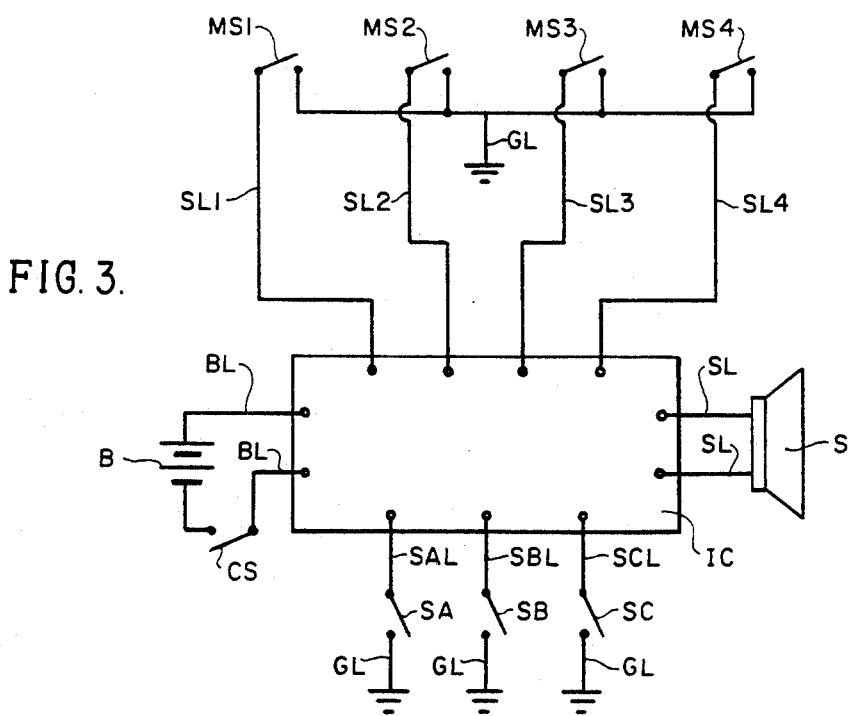

In FIG. 3 there is presented a schematic diagram of the preferred electronic tray circuitry associated with the highchair tray 20 of FIG. 2 for producing an appropriate voice, sound or musical response corresponding to the subject matter sequence of the picture blocks PA1-PA4, PB1-PB4 and PC1-PC4 of insert panels 22A, 22B and 22C, respectively, in response to finger touch actuation of the picture blocks of each panel. The heart of the tray circuitry is integrated circuit microchip IC, including a plurality of ports or terminals and within which is stored voice, sound and musical information related to the picture block sequence of each insert panel. The integrated circuit microchip IC is electrically interconnected through its ports or terminals to: speaker S via leads SL; battery power source B via leads BL; the four touch sensors or pressure actuated micro-switches MS1-MS4 via leads SL1, SL2, SL3 and SL4, respectively, and lead GL connected to ground; and to the panel identity switches SA, SB and SC, respectively, via leads SAL, SBL and SCL, and leads GL connected to ground. One of the leads BL of the battery power source B includes the tray circuit master "on-off" switch CS.

In operation of the tray circuitry of the invention a selected tray insert panel 22A, 22B or 22C is placed on the tray 22. If, for example, insert panel 22A is placed on tray 22 switch contact CA interacts with panel identity switch SA to close such switch and activate that portion of the integrated circuit microchip IC wherein is stored voice, sound or musical information corresponding to the subject matter sequence of the picture block series PA1-PA4. With the master "on-off" switch CS closed power is introduced to the tray circuitry. Pressure applied to any one of the touch sensors or microswitches MS1-MS4 via finger touch pressure applied to the overlying insert panel picture blocks PA1-PA4 closes the tray circuitry and microchip circuitry to the extent that it releases in audible form the stored information related to insert panel 22A and the block picture on such panel that has been touched. Such specific information released by the microchip circuitry is played as voice information, sound information or musical information through speaker S.

It should be understood that the highchair tray top insert panels of the invention, which each bear a sequence of picture blocks, are preferably formed of relatively thin and flexible sheet plastic material so that the picture block areas are depressible by finger pressure from a baby seated in the highchair. Further, such panels must be fabricated of liquid resistant material and be capable of being washed after use in the tray top before, during and after the feeding of a baby. Likewise, the highchair tray top 20 itself must be provided with a suitable coating material over its upper surface to protect the interface areas whereat the touch sensors or pressure sensitive microswitches MS1–MS4 are located.

It should also be understood that the layout of picture block areas on the highchair tray top insert panels of the invention should not be limited to four blocks in number, i.e., an insert panel may have several rows of picture blocks oriented so as to overlay several rows of touch sensors or pressure sensitive microswitches on the upper surface of the highchair tray. Further, the related subject matter of the series of picture blocks presented on insert panels may include (but is not limited to): animal pictures which when touched respond with an appropriate animal sound (lion with a roar); vehicle pictures which when touched respond with an appropriate vehicle sound (auto with a horn toot); color presentations which when touched respond with an appropriate voice description (red with voice response "the color is red"); musical instrument pictures which when touched respond with an appropriate musical refrain of the instrument; and letters of the alphabet which when touched respond with an appropriate voice description ("A" with voice response "the letter is an A for words such as apple"). Numerous other picture block series are possible including: "numbers" with voice description response; "family members" with voice description response; "nature items" such as a tree with voice description response.

The battery power source B for the tray circuitry may be of any low voltage type including long-life, watch-type mercury cells, 1.5 volt "AA" size alkaline cells, or the like. The speaker S may be a miniature dynamic speaker or a small buzzer-type speaker preferably formed of a piezo-electric semiconductor element. The integrated circuit microchip IC for storing voice, sound and/or musical information may be interchangeable in that a variety of microchips with differing series of such information may be plugged into the tray circuitry to correspond to varying series of tray top insert panels.

While preferred embodiments of the present invention have been disclosed herein and illustrated in the accompanying drawing figures, it will be apparent to one skilled in the art that many variations and modifications may be made without departing from the scope and spirit of the invention as defined by the following claims.

What I claim is:

1. Baby entertainment and learning apparatus for highchairs comprising:
    a) a tray having means for removably attaching said tray to a highchair, said tray providing a top surface for holding baby feeding bottles, cups, dishes and utensils and baby play toys, said tray including in the top surface at least one pressure activated microswitch;
    b) an interchangeable tray top panel including at least one depressible picture block and a panel identity means, said at least one picture block being oriented on said panel so as to overlay the said at least one pressure activated microswitch of said tray; and
    c) tray circuitry components mounted to an underside of said tray and including: an integrated circuit microchip within which is stored voice, sound and musical information; a low voltage battery power source; a speaker; and panel switch means,
    said circuitry components being electrically interconnected with said panel switch means being closed by said panel identity means when said tray top panel is in place on said tray, and
    said circuitry components being activated by finger touch pressure applied through said at least one picture block of said panel to the said at least one pressure activated microswitch of said tray to selectively release the stored information of said microchip corresponding to the subject matter of the said at least one picture block as audible voice, sound and musical information through said speaker.

2. Baby entertainment and learning apparatus as claimed in claim 1 wherein the tray circuitry components mounted to the underside of said tray include an "on-off" master switch to turn on or close off the low voltage battery power source.

3. Baby entertainment and learning apparatus as claimed in claim 1 wherein the low voltage battery power source is replaceable.

4. Baby entertainment and learning apparatus as claimed in claim 1 wherein the speaker means is a small buzzer-type speaker including a piezoelectric semi-conductor element.

5. Baby entertainment and learning apparatus as claimed in claim 1 wherein the speaker means is a miniature dynamic speaker.

6. Baby entertainment and learning apparatus as claimed in claim 1 wherein the panel switch means is comprised of a microswitch including a permanent magnet switch arm with said switch means being closed upon placement of said tray top panel on said tray through magnetic attraction of said switch arm to said panel identity means.

7. Baby entertainment and learning apparatus as claimed in claim 6 wherein the panel identity means is comprised of a magnet attracting object mounted to the tray top panel.

8. Baby entertainment and learning apparatus as claimed in claim 1 wherein the panel switch means is comprised of a microswitch including open electrical leads with said leads being closed upon placement of said tray top panel on said tray through electrical contact thereof with said panel identity means.

9. Baby entertainment and learning apparatus as claimed in claim 8 wherein the panel identity means is comprised of a conductive member mounted to the tray top panel for electrically connecting the leads of said panel switch means.

10. Baby entertainment and learning apparatus for highchairs comprising:
    a) a tray having means for removably attaching said tray to a higher, said tray providing a top surface for holding baby feeding bottles, cups, dishes and utensils and baby play toys, said tray including in the top surface a series of at least two pressure activated microswitches;
    b) a series of interchangeable tray top panels each including a series of depressible picture blocks matching in number the pressure activated microswitches of said tray, and individual panel identity means associated with each of said tray top panels, the series of picture blocks of each of said panels being oriented thereon so as to overlay the pressure activated microswitches of said tray; and
    c) tray circuitry components mounted to an underside of said tray and including: an integrated circuit microchip including a plurality of terminals and within which is stored voice, sound and musical information; a low voltage battery power source; audio speaker means; and panel switch means corresponding in number to the series of said tray top panels, said circuitry components being electrically interconnected with the panel switch means for each of said tray top panels being closed, respectively, by the panel identity means of each of said panels when said panels are individually in place on said tray, and said circuitry components being activated by finger touch pressure applied to the picture blocks of the tray top panel in place on said tray and therethrough to the pressure activated microswitches of said tray to selectively release the stored information of said microchip corresponding to the subject matter of the picture blocks of said tray top panel as audible voice, sound and musical information through said speaker means.

11. Baby entertainment and learning apparatus as claimed in claim 10 wherein the tray circuitry components mounted to the underside of said tray include an "on-off" master switch to turn on or close off the low voltage battery power source.

12. Baby entertainment and learning apparatus as claimed in claim 10 wherein the low voltage battery power source is replaceable.

13. Baby entertainment and learning apparatus as claimed in claim 10 wherein the audio speaker means is a small buzzer-type speaker including a piezoelectric semi-conductor element.

14. Baby entertainment and learning apparatus as claimed in claim 10 wherein the audio speaker means is a miniature dynamic speaker.

* * * * *